United States Patent

Butscher

[15] 3,675,238

[45] July 4, 1972

[54] INTERPOLATION MEANS FOR DISPLACEMENT MEASUREMENT

[72] Inventor: Karlheinz Butscher, Langenargen/Bodensee, Germany

[73] Assignee: Carl Zeiss-Stiftung, Wuerttemberg, Germany

[22] Filed: Sept. 3, 1970

[21] Appl. No.: 69,264

[30] Foreign Application Priority Data

June 9, 1969 Germany ......................P 19 45 206.3

[52] U.S. Cl. ....................340/347 SY, 340/347 AD, 328/116

[51] Int. Cl. ..........................................................H03k 13/14

[58] Field of Search ...............340/347 SY, 347 CC, 347 AD; 328/116

[56] References Cited

UNITED STATES PATENTS

| | | | |
|---|---|---|---|
| 3,392,386 | 7/1968 | Evans et al. | 328/116 |
| 3,364,480 | 1/1968 | Roth | 340/347 |
| 3,553,678 | 1/1971 | Reeves et al. | 340/347 |

*Primary Examiner*—Thomas A. Robinson
*Attorney*—Sandoe, Hopgood and Calimafde

[57] ABSTRACT

The invention contemplates employment of plural preset comparators, such as flip-flop set to trigger at different reference-voltage levels, to accurately identify and quantize discrete voltage levels in the electric-signal wave form by which displacement increments are tracked, or picked off, for measurement. The fast change of state in each of the elements of such a device makes possible the prompt, accurate and unambiguous identification of each particular displacement increment. The described device is inherently applicable to digital encoding for remote transmission, and several embodiments are described.

11 Claims, 12 Drawing Figures

Fig. 6a
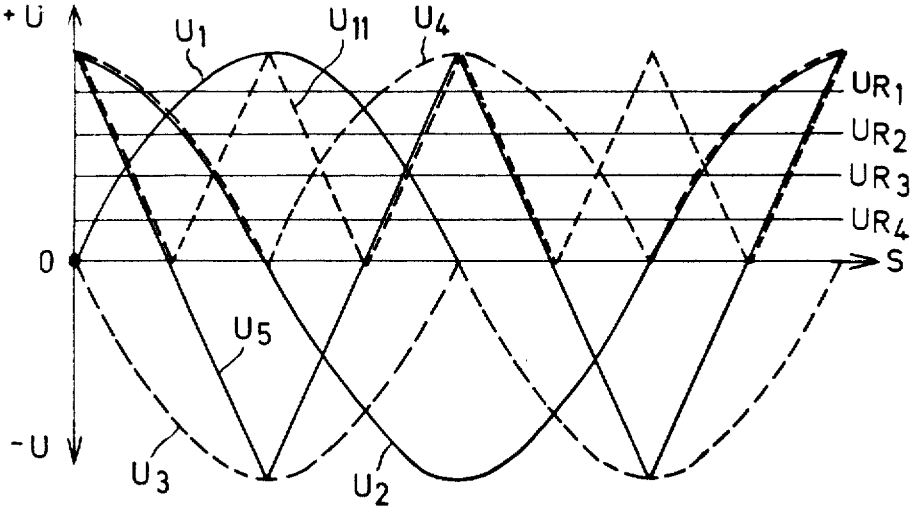
Fig. 6b
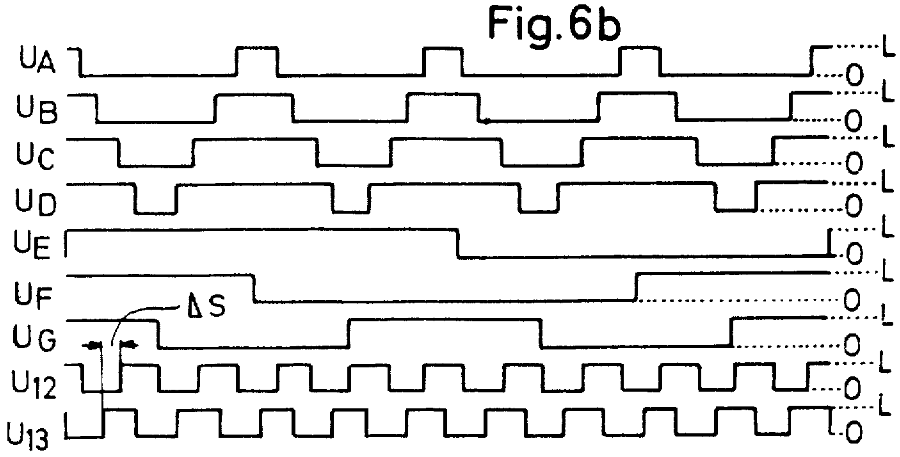
Fig. 6c
A LOO OO OOO O LL OOOOOO OOL LOOOO OOOO LLOO OOO OOOL
B LLO OO OOOL LL LOOOOOO LL LLOOOOOOL LLLO OOO OOLL
C LLL OOOO LLLL LLOOOOLLLLLLOOOO LLLLLLOOOOLLL
D LLL LOO LLLLLL LLLOOLLLLLLLLOOLLLLLLLLLOOLLLL
E LLL LLLLLLLL LLLLLLLLOOOOOOOOOOOOOOOOOOO O
F LLLL LLLLLLO OO OOOOOOOOOOOOO OOOOOOLL LLLLLLLL
G LLLLLOOO OOO OOOOLLLLLLLLLOOOOOOOOOOOLL LLL

INTERPOLATION MEANS FOR DISPLACEMENT MEASUREMENT

This invention relates to an arrangement for interpolation of periodic electric signals dependent on displacement, whether longitudinal or angular.

In the measurement of displacement or of angle, it is presently general practice, for reasons of objectifying the measuring results, to digitally indicate or further process the measured values.

Measuring arrangements of the type indicated generally involve linear measuring systems or angle pickoffs which supply periodic electric signals in accordance with the change in displacement or angle.

In order to be able to recognize the direction of the measuring action, it is general practice in such measuring arrangements to at least generate two phase-shifted signals.

For increasing the resolving power of these measuring arrangements, it is prior art to subdivide the periodic length of the signals dependent on displacement and angle, respectively, i.e., to interpolate electrically.

However, various methods of the hitherto used interpolation methods suffer from the shortcoming that they are not independent of the amplitudes of the signals supplied, or they are also susceptible to changes in phase of the input signals. Moreover, it is prior art to attain an interpolation by a doubling of frequency of the input signals and subsequent triggering of their zero passages. However, the interpolation factor attainable thereby is relatively small.

Furthermore, it is prior art to interpolate displacement-measuring signals indirectly via a saw-tooth voltage dependent on time which is compared with a number of fixed voltages. However, this prior method is dependent on very fine divisions and a uniform course of movement, respectively, in the measuring operation.

It is an object of the present invention to avoid the above-described disadvantages, and to attain a more far-reaching interpolation, with relative economy.

According to the invention, the foregoing objects are attained by providing that the signal dependent on displacement (whether lineal or angular), and being interpolated, is passed through a number of comparators ($K_1$, $K_2$ ...) of different trigger levels ($U_{R1}$, $U_{R2}$ ...), and the trigger levels are adapted to the given signal waveform and to the respective signal amplitude, such that after each given interpolation step ($\Delta s$) there is a sudden change in the output voltage ($U_A$, $U_B$ ...) across at least one comparator output.

The adaptation of the trigger levels to the instantaneous amplitude of the interpolating signal is effected either by stabilizing the amplitude itself or by re-setting the trigger levels.

Preferably, this is controlled via a reference signal dependent on the input signal amplitude, and when using several phase-shifted signals, also on the changes in phase. The reference signal can be derived from the pickoff of the measuring system itself or can be generated from the phase-shifted measuring signals supplied to the interpolator.

Further details, features and objects of the invention will be pointed out or will occur to those skilled in the art from a reading of the following specification, in conjunction with the accompanying drawings.

In said drawings:

FIG. 1 is an electrical block diagram schematically showing elements of an interpolation circuit of the invention;

FIGS. 2*a*, 2*b* and 2*c* are graphical displays of waveforms at different parts of the circuit of FIG. 1, said displays being for voltage U as a function of displacement S to be interpolated;

FIG. 2*d* is a code display applicable to the functional operation of the interpolation circuit of FIG. 1;

Figure 2A:
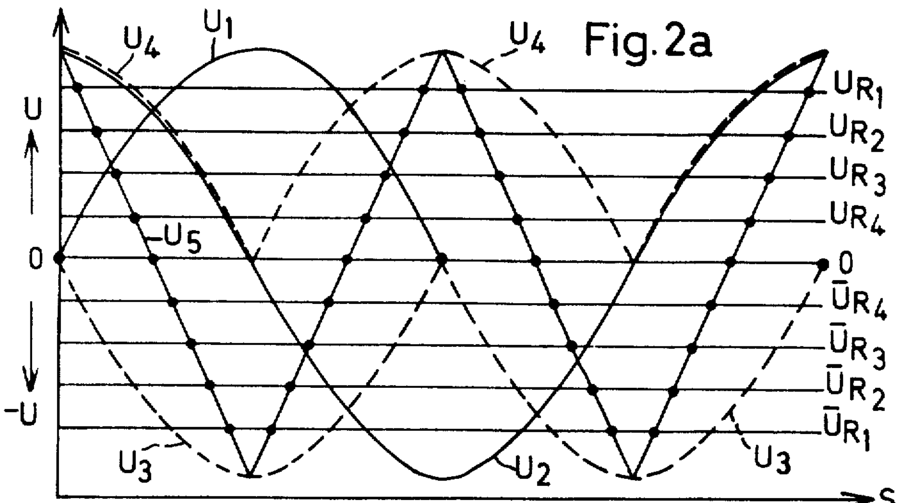
Figure 2B:
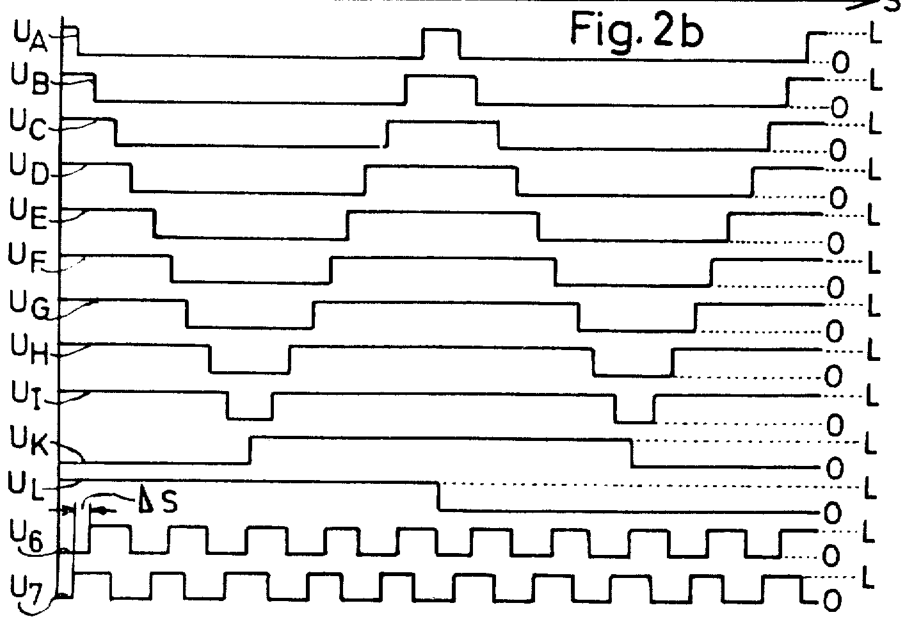
Figure 2D:
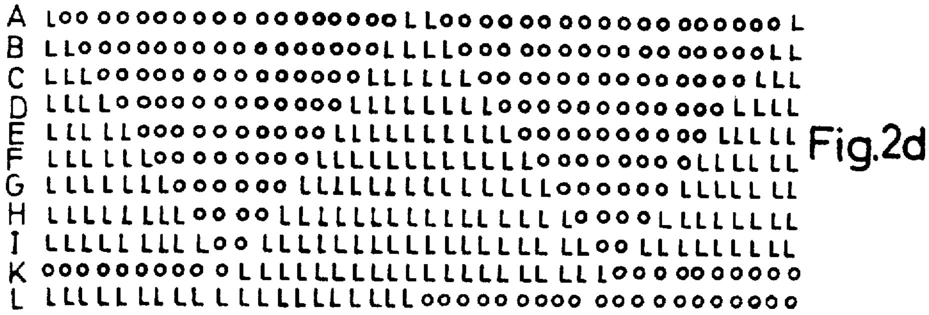
Figure 7:
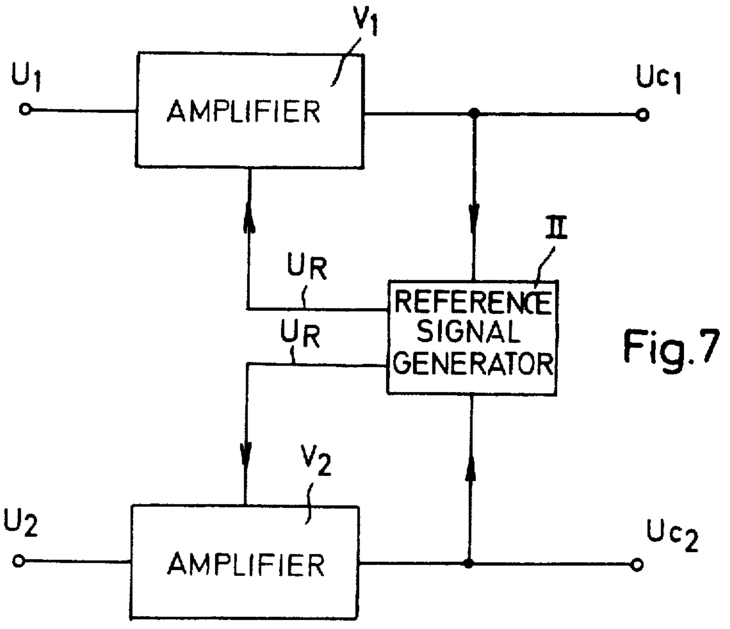
Figure 5:
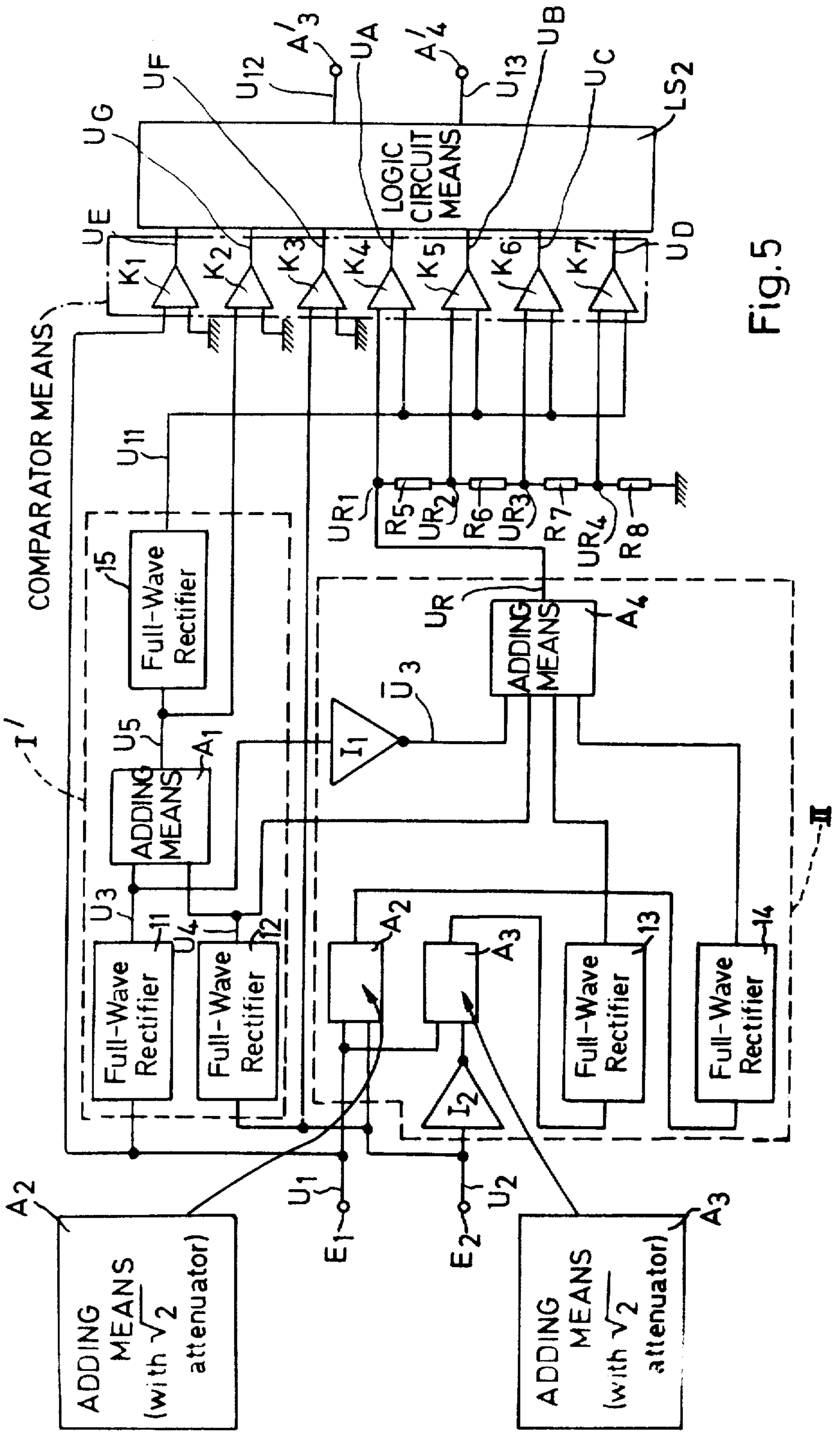
FIG. 5 is a block diagram similar to FIG. 1, to illustrate a modification.

FIGS. 6*a*, 6*b* and 6*c* are displays corresponding to those of FIGS. 2*a*, 2*b* and 2*d* but applicable to the circuit of FIG. 5; and FIG. 7 is a simplified block diagram to illustrate a further modification.

Signal voltages $U_1$ and $U_2$ are supplied at interpolator inputs $E_1$ and $E_2$ (FIG. 1), the signals $U_1$ and $U_2$ being generated by pickoff means (not shown) forming part of displacement or angle-measuring means of known construction. The signals $U_1$, $U_2$ are in quadrature (i.e., 90° phase-displaced) and sinusoidal, each covering a full cycle for a full unit of displacement S to be measured, as for example a full single rotation of a shaft, it being understood that repeated cycles of the shaft rotation (or other unit of displacement) are counted by other means, not shown. In a first signal-processing circuit I, signals $U_1$, $U_2$ are rectified by full-wave rectifiers 11, 12, to produce voltages $U_3$, $U_4$ across their outputs (see FIG. 2a); a second signal-processing circuit or reference-signal generator II will be later described. The two signals $U_3$, $U_4$ are summed in an adding stage $A_1$, to produce a triangle-shaped signal $U_5$ in known manner (see FIG. 2*a*). The signal $U_5$ has double the amplitude of either signals $U_3$, $U_4$; it also has twice as many intercepts of the zero-U axis, and these intercepts are phase-displaced 45° with respect to those of the input signals $U_1$, $U_2$. The signal $U_5$ may thus be effectively a frequency-doubled signal, and will be so termed.

The input signals $U_1$, $U_2$ and the frequency-doubled signal $U_5$ obtained therefrom are applied to the inputs of a number of comparators $K_1$, $K_2$, $K_3$, $K_4$, $K_5$ ..... $K_{11}$, as for example flip-flops of known construction; the nature of these comparator circuits is to cause sudden change in a particular comparator-output voltage ($U_A$, $U_b$ ..... $U_L$) when and if the applied-signal voltage ($U_1$, $U_2$ or $U_5$, as the case may be) passes through the magnitude corresponding to the trigger-voltage level for the corresponding particular comparator-reference input setting. The reference-input connections of comparators $K_1$, $K_2$, $K_3$ are all grounded; hence, their trigger-voltage level is equal to zero. The trigger-voltage levels are designated $\bar{U}_{R1}$, $\bar{U}_{R2}$, $\bar{U}_{R3}\bar{U}_{R4}$, respectively, for comparators $K_4$, $K_5$, $K_6$, $K_7$, and are designated $U_{R1}$, $U_{R2}$, $U_{R3}$, $U_{R4}$, respectively, for comparators $K_8$, $K_9$, $K_{10}$, $K_{11}$.

The trigger-voltage levels for comparators $K_4$ to $K_7$ are supplied from a first voltage divider comprising a resistor chain $R_1$, $R_2$, $R_3$, $R_4$, and trigger-voltage levels for comparators $K_8$ to $K_{11}$ are supplied from a second voltage divider comprising a resistor chain $R_5$, $R_6$, $R_7$, $R_8$. These resistor chains are in turn supplied by reference voltages $\bar{U}_R$ and $\bar{U}_R$, respectively, as will later be more fully described.

Each resistor chain is preferably designed to establish regulator measurement intervals of the displacement or angle S, depending upon the nature of the signal waveform being interpolated; thus, the trigger-voltage levels at connection points along each chain establish output-voltage changes in the respective comparators at regular intervals, corresponding to equal changes in the displacement or angle S. Since in the form shown the signal $U_5$ (being interpolated) has the form of an isosceles triangle, all resistors $R_1$, $R_2$ ..... $R_8$ are of equal magnitude; it will be understood, however, that by suitable selection of elements in each resistor chain, any particular signal waveform can be accommodated as long as it is not characterized by any infinite slopes, such as for example sudden change from zero to maximum positive or to maximum negative.

Figure 4:
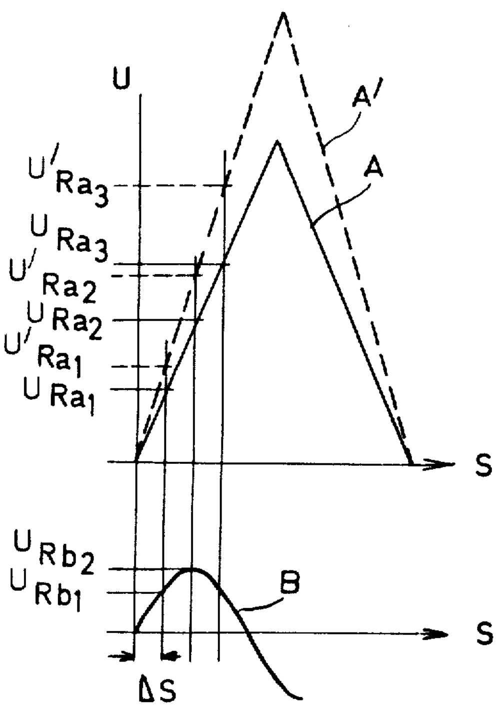
FIG. 4 is a further graphical display of voltage U as a function of displacement S.

To illustrate the indicated trigger-voltage relationship, reference is made to FIG. 4, in which plural trigger-voltage levels $U_{Ra}$ and $U_{Rb}$, respectively, are shown for a triangular waveform A and for a sinusoidal waveform B, in conjunction with pre-established interpolation steps or increments $\Delta S$. The resistor chain must be stepped in the same ratio as the corresponding trigger-voltage levels.

For example, if the signal level is increased, thereby altering the signal waveform A by an increase in amplitude to that shown at A' (dashed lines), all pre-established trigger levels must be reset to values indicated by primed notation (e.g., $U'_{Ra}$) if triggering is to be effected at the same displacement points $s$. It follows that the trigger levels must assume different values with changes in amplitude of the interpolating signal if the initiation of the interpolation signals is to be effected at the same points $s$.

The signal-processing circuit II (FIG. 1) illustrates how the respective trigger levels can be correctively reset, for changes in amplitude and phase of the interpolating signal, by providing a reference signal $U_R$.

In circuit II, the input signals $U_1$ and $U_2$ are supplied to another adding stage $A_2$. By the addition of these two input signals, an output signal is obtained in known manner having the same frequency as the input signals $U_1$ and $U_2$, however, being shifted in phase by −45° and having an amplitude greater by the factor $\sqrt{2}$. Stage $A_2$ includes means for attenuating the added resultant of signals $U_1$, $U_2$, to the extent of the factor $\sqrt{2}$, and its output is supplied to a full-wave rectifier 14, to produce the rectified positive signal $U_{10}$ (see FIG. 2*c*). In a separate line, the input signal $U_2$ is inverted by means of an inverter stage $I_2$ and added to the input signal $U_1$ in another adding stage $A_3$, thereby producing a signal of amplitude greater by the factor $\sqrt{2}$, and of the frequency of the input signals $U_1$ and $U_2$, respectively, but shifted in phase by +45° with respect to signal $U_1$; this signal, attenuated by the factor $\sqrt{2}$ of the adding stage $A_3$, is supplied to a full-wave rectifier 13 across the output of which the positive signal $U_9$ is obtained (see FIG. 2*c*). The positively rectified half-waves of the signals $U_9$ and $U_{10}$ are supplied to a fourth adding stage $A_4$, together with the signal $U_4$ and together with the signal $\bar{U}_3$, the latter being the signal $U_3$ after inversion in an inverter stage $I_1$. The addition of these four signals is represented by the reference signal $U_R$ (see FIG. 2c) which is proportional to the amplitudes of the input signals $U_1$ and $U_2$.

Figure 2C:
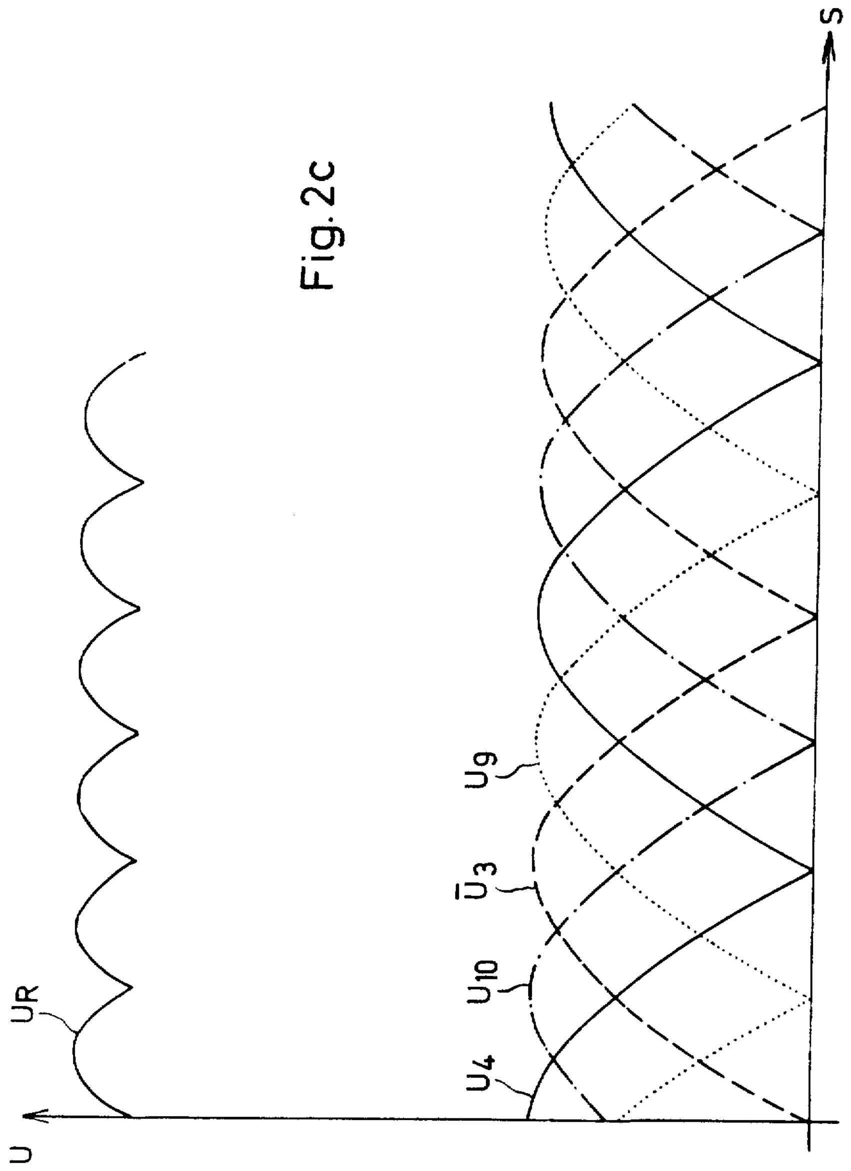

By an appropriate attenuation of the reference signal $U_3$ the modulation or ripple obvious from FIG. 2*c* can be made almost ineffective. Besides, the modulation can substantially be decreased, to practically no significance, by doubling the number of phase-shifted half-wave signals supplied to the adding stage $A_4$. Test results establish, for example, that with ±90° phase shifts of the two input signals $U_1$ and $U_2$, the reference signal $U_R$ (FIG. 2*c*) adapts to the signal $U_5$ being interpolated (FIG. 2*a*), and that the interpolation arrangement operates correctly up to almost 0° phase shift.

As already noted, the references voltage $U_R$ is applied across one resistor chain $R_5$, $R_6$, $R_7$, $R_8$, and after inversion at an inverter stage $I_3$ it is also applied across the other resistor chain $R_1$, $R_2$, $R_3$, $R_4$; the inverted reference voltage is designated $\bar{U}_R$. It will be seen that the trigger levels $U_{R1}$ $U_{R4}$ and $\bar{U}_{R1}$ $\bar{U}_{R4}$, connected to the respective reference inputs of the comparators $K_4$ $K_{11}$ necessarily follow or track the reference signal $U_R$ (and $\bar{U}_R$), in both amplitude and phase, and that the described circuits also correctly follow amplitude and phase variations of the signals being interpolated.

FIG. 2*b* illustrates, on the same displacement base as FIG. 2*a*, the changes in state of flip-flops $K_1$ to $K_{11}$ in the course of a full cycle of displacement S. For example, the flip-flop $K_1$, which is connected to directly track the input signal $U_1$, with respect to zero-volts (ground) reference, produces an output voltage $U_L$ which is characterized by one state for the first half of the $U_1$ cycle and by its other state (zero-volts output) for the second half of the $U_1$ cycle. In like manner, flip-flop $K_2$, which is connected to track the other input signal $U_2$ (90° phase-displaced from $U_1$), produces an output voltage $U_K$ similar to $U_L$ but 90° phase-displaced therefrom. The other flip-flops or comparators are shown to produce analogous output voltages $U_A$, $U_B$ ..... $U_I$, dependent on change of state determined when the interpolating signal $U_5$ traverses each of the predetermined trigger-voltage levels.

Figure 1:
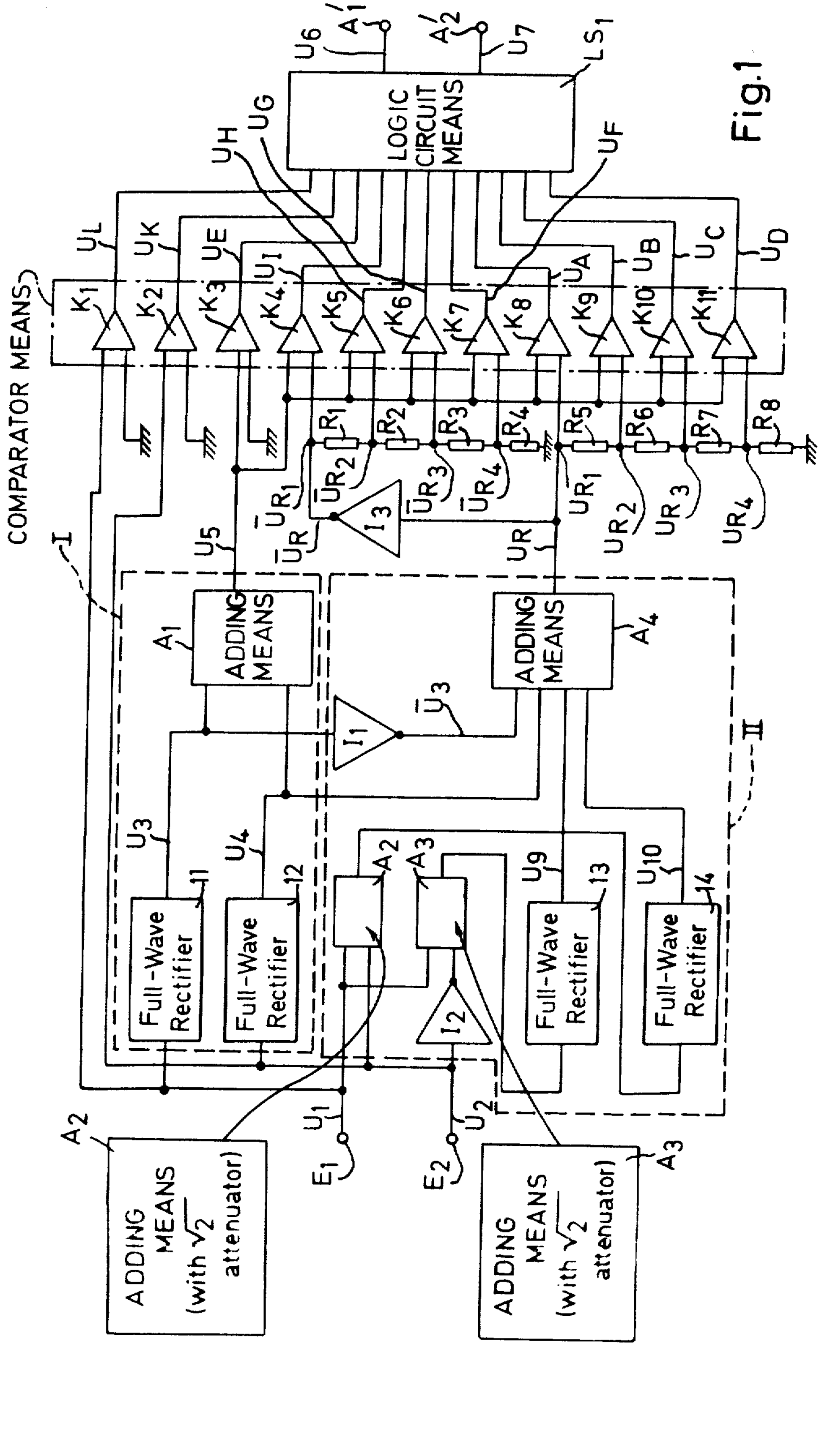
Figure 3:
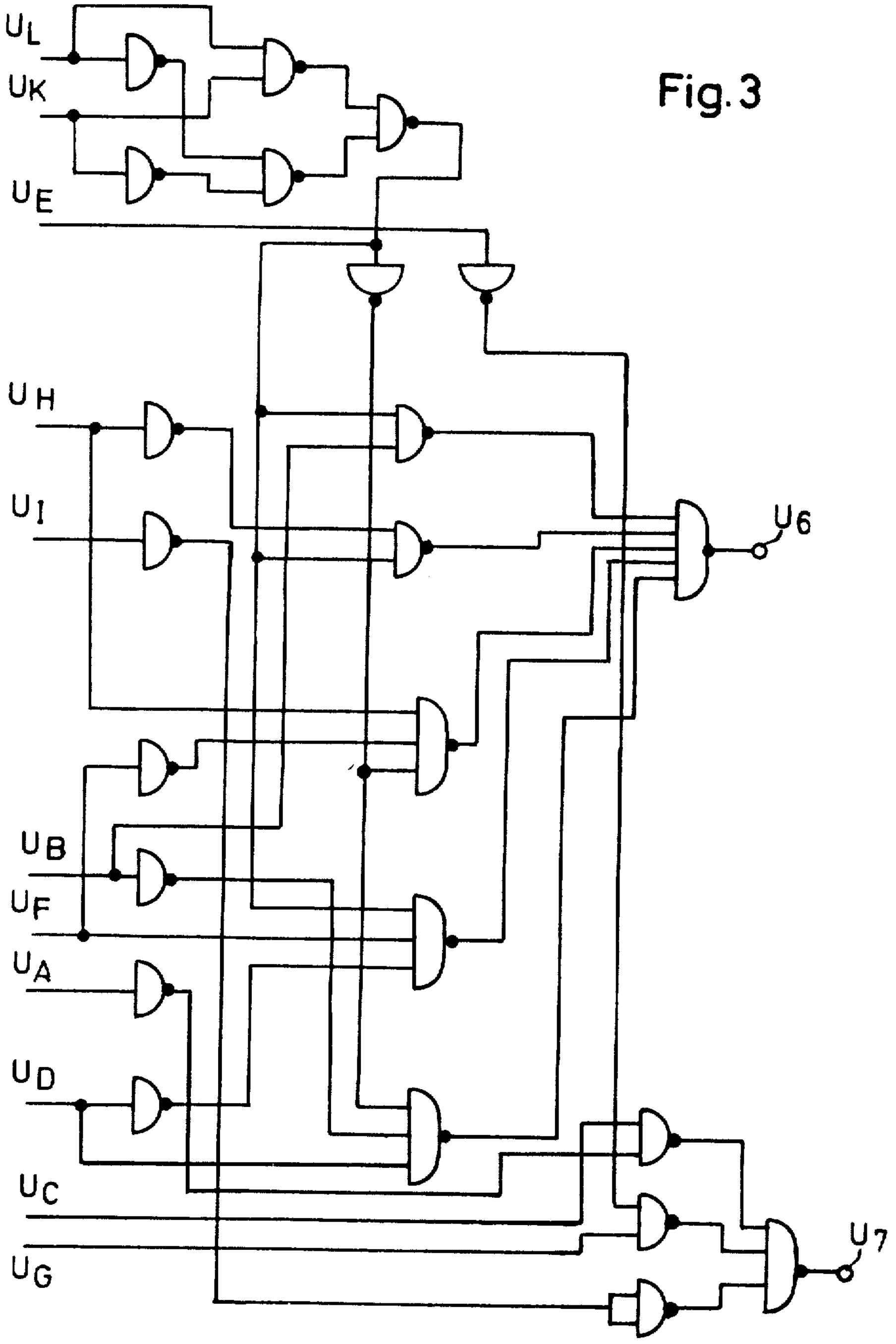
FIG. 3 is a circuit diagram of logic-circuit means constituting a part of the circuit diagram of FIG. 1.

FIG. 1 shows that the described signal-sequencing voltages $U_A$, $U_B$ ..... $U_L$, originating through action of the comparator or flip-flop elements $K_1$ .....$K_{11}$, may be supplied to logic circuit means $LS_1$ of known type, whereby voltages $U_6$ and $U_7$ (see FIG. 2*b*) are obtained at the respective output terminals $A'_1$ and $A'_2$. An illustrative logic circuit $LS_1$, shown in FIG. 3, is seen to substantially comprise plural inverter stages and NAND-elements; since the circuit is conventional, it need not be described other than by legend identification of the input-voltage connections $U_A$, $U_B$..... $U_L$ and of the voltage-output terminals at which voltages $U_6$ and $U_7$ are produced.

The phase displacement or side spacing $\Delta s$ of the voltages $U_6$ and $U_7$ (FIG. 2b) is smaller by the interpolation factor (here 40) than the full period of the input signals $U_1$ and $U_2$. This displacement between signals $U_6$ and $U_7$ is 90° to enable correct counting with respect to their sign, in connection with a known bidirectional counter (not shown) having a quartering logic.

If the interpolation steps are not to be counted but rather are to be encoded, as for remote transmission, it will be understood that, in place of the logic circuit $LS_1$, a known encoding network may be operated according to the code indicated in FIG. 2d, reflecting the pattern of the changing flip-flop states O and L, noted as voltage levels in FIG. 2b. Thus encoded, a fixed digital value can be associated with each interpolation value $\Delta s$. The embodiment according to FIG. 1 is thus seen to generate 40 different fixed values (see FIG. 2*b*) for each cycle of displacement S to be measured.

FIG. 5 illustrates another interpolation arrangement according to the invention, using some of the same structural elements as the arrangement according to FIG. 1; like parts are therefore referenced by the same reference numerals in both Figures. However, in the embodiment according to FIG. 5, the first signal-processing means is modified (identified I'), in that the signal $U_5$ originating from the adding stage $A_1$ is supplied to a full-wave rectifier 15, thus generating a signal $U_{11}$ (see FIG. 6*a*) the frequency of which is doubled with respect to $U_5$, but which is characterized by the same number of intercepts of the zero-U axis as in the case of voltage $U_5$. In the circuit of FIG. 5, the signal $U_{11}$ is applied at one respective input of the comparators (e.g., flip-flops) $K_4$, $K_5$, $K_6$ and $K_7$. However, the same circuit II of FIG. 1 will be recognized, to obtain the reference signal $U_R$ from the addition of signals $\bar{U}_3$, $U_4$, $U_9$ and $U_{10}$. In the embodiment of FIG. 5, the signal $U_R$ need not be negated (inverted), since the signal $U_{11}$ is only positive, as can be seen from FIG. 6a. The reference signal $U_R$ is again subdivided by means of the resistor chain $R_5$, $R_6$, $R_7$ and $R_8$ so that when using any desired signal $U_{11}$ (with the restriction already made, and with the aid of comparators), sudden changes in the comparator output voltages (e.g., changes in flip-flop state) occur at regular intervals (see FIG. 6*b*).

In the example illustrated in FIG. 5 in which the input signals $U_1$ and $U_2$, respectively, are to be subdivided into 40 parts, a quasi-triangular function has again been assumed, calling for a resistance ratio of 1:1; thus, $R_5 = R_6 = R_7 = R_8$. The reference voltages $U_{R1}$, $U_{R2}$, $U_3$ and $U_{R4}$ are applied to the second input of the comparators $K_4$ $K_7$. The signals $U_1$, $U_2$ and $U_5$ are triggered by means of the comparators $K_1$, $K_2$ and $K_3$, as these voltages traverse or attain the zero-U axis. The output signals of the comparators $K_1$ ... $K_7$, namely, $U_E$, $U_G$, $U_F$, $U_A$, $U_B$, $U_C$ and $U_D$, may be supplied to appropriate logic-circuit means $LS_2$ in known manner so that signals $U_{12}$ and $U_{13}$ (shown in FIG. 6b) are obtained across the outputs $A'_3$ and $A'_4$, respectively.

The embodiment of FIG. 5 also lends itself to the encoding of fixed values associated with the interpolation steps within a period or a part of a period. To this end, the logic-circuit $LS_2$ may be replaced by a known encoding network operating according to the code of FIG. 6*c*.

It will be evident that the arrangement shown in FIG. 5 is distinguished by a substantially reduced number of circuit elements (comparators). It will be further understood that the invention is not bound to the embodiments shown hereinbefore, but that numerous variants can be realized within the scope and nature of the invention. Thus, by way of example, instead of causing the trigger levels to follow via a reference signal, the amplitude of the input signals can be maintained constant, as for example using the same reference signal, as illustrated in FIG. 7. Herein, the input signals $U_1$ and $U_2$ are first passed through amplifiers $V_1$, $V_2$ of variable amplification, the gain of which is controlled via a reference-signal generator meeting the description of the structural element II of FIG. 1.

The input signals $U_{C1}$ and $U_{C2}$, respectively, thus maintained constant, are then processed further, as already shown, with the difference that now a fixed d.c. voltage can be applied across the resistor chains.

It is also possible to obtain the reference signals (dependent on amplitude) directly from the pickoff, as in the case of a photoelectric pickoff from the intensity of a light source operated by picked-off voltage.

What is claimed is:

1. Means for interpolation of continuously varying periodic electric signals of amplitude dependent upon displacement, comprising a plurality of comparators each having an input trigger-level connection and an input control connection, displacement-responsive reference-voltage means including voltage-dividing means with plural taps each continuously connected to the input trigger-level connection of a different comparator whereby each comparator is capable of output change in accordance with a different input voltage, and means continuously connecting a periodic electric signal in common to the control inputs of a plurality of said comparators, whereby in the course of periodic variation of the electric signal said comparators are caused to change their output states in a succession corresponding to the electric signal change, so that such changes in output states directly reflect displacement change.

2. MeanS according to claim 1, in which said comparators are flip-flops.

3. Means according to claim 1, in which said connecting means includes means for maintaining constant the amplitude of the signal being interpolated.

4. Means according to claim 1, in which said reference-voltage means includes an input control connection referenced to the amplitude of the electric signal being interpolated.

5. Means according to claim 4, in which said voltage-dividing means comprises a chain of resistors.

6. Means according to claim 1, in which said periodic electric signal comprises at least two phase-displaced signals dependent on displacement, and in which said reference-voltage means includes input means connected for concurrent response to both said phase-displaced input signals.

7. Means according to claim 1, in which said periodic electric signal comprises at least two phase-displaced signals dependent upon displacement, said connecting means comprising means combining both said phase-displaced signals prior to supply to said comparators.

8. Means according to claim 7, in which said signals are 90° phase-displaced and in which said last-defined means combines said signals to produce a succession of triangular waveforms.

9. Means according to claim 8, in which said voltage-dividing means comprises plural taps at equal voltage increments, whereby displacement increments identified by comparator action may be correspondingly equal.

10. Means for interpolation of periodic electric signals dependent upon displacement, comprising a plurality of comparators each having an input trigger-level connection and an input control connection, reference-voltage means including voltage-dividing means with plural taps each connected to the input trigger-level connection of a different comparator whereby each comparator is capable of output change in accordance with a different input voltage, and means connecting a periodic electric signal in common to the control inputs of a plurality of said comparators, said periodic electric signal comprising at least two 90° phase-displaced signals dependent upon displacement, said connecting means comprising means combining both said phase-displaced signals in triangular waveform prior to supply to said comparators, whereby in the course of periodic variation of the electric signal said comparators are caused to change their output states in a succession corresponding to electric-signal change, said taps being at equal voltage increments, whereby displacement increments identified by comparator action may be correspondingly equal, and said reference-voltage means including input means connected for concurrent response to both said phase-displaced input signals, whereby amplitude variation in the resultant of said phase-displaced input signals is neutralized in the successive triggering of said comparators:

11. MeanS for interpolation of periodic electric signals dependent upon displacement, comprising a plurality of comparators each having an input trigger-level connection and an input control connection, reference-voltage means including voltage-dividing means with plural taps each connected to the input trigger-level connection of a different comparator whereby each comparator is capable of output change in accordance with a different input voltage, and means connecting a periodic electric signal in common to the control inputs of a plurality of said comparators, said periodic electric signal comprising at least two phase-displaced signals dependent upon displacement, said connecting means comprising means combining both said phase-displaced signals prior to supply to said comparators, whereby in the course of periodic variation of the electric signal said comparators are caused to change their output states in a succession corresponding to electric-signal change, and said reference-voltage means including input means connected for concurrent response to both said phase-displaced input signals, whereby amplitude variation in the resultant of said phase-displaced input signals is neutralized in the successive triggering of said comparators.

* * * * *